UNITED STATES PATENT OFFICE.

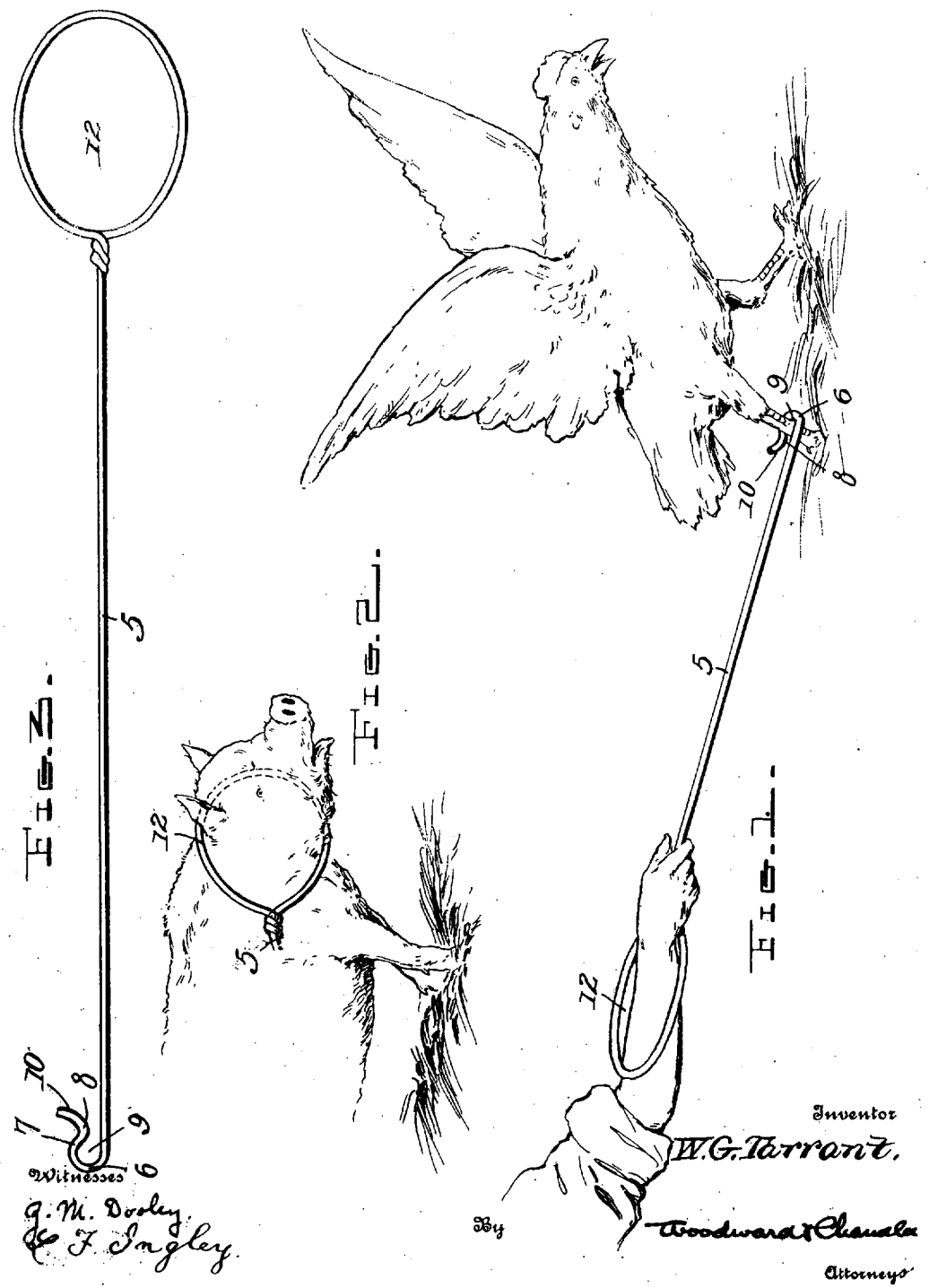

WILLIAM G. TARRANT, OF VERSAILLES, ILLINOIS.

ANIMAL AND FOWL CATCHER.

No. 901,210.  Specification of Letters Patent.  Patented Oct. 13, 1908.

Application filed August 27, 1907. Serial No. 390,301.

*To all whom it may concern:*

Be it known that I, WILLIAM G. TARRANT, citizen of the United States, residing at Versailles, in the county of Brown and State of Illinois, have invented certain new and useful Improvements in Animal and Fowl Catchers, of which the following is a specification.

This invention relates to animal catchers, and more particularly to hand catchers, and has for its object to provide a catcher which may be used in connection with stock or poultry raising, and by which animals and fowls may be quickly and easily caught.

Another object is to provide a catcher which will be free from complicated parts, which will be extremely simple and which, as an article of manufacture, may be produced at a low figure.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a view showing the catcher in use to catch a fowl; Fig. 2 is a view showing the catcher looped around the neck of an animal; Fig. 3 is an elevational view.

Referring now to the drawings, the present catcher is formed of a stiff metallic rod 5 having one end bent laterally as shown at 6 and then rearwardly, as shown at 7. The rearwardly bent portion has an inwardly directed kink 8 extending toward the main portion of the rod 5 to form a loop 9, and rearwardly of the kink 8, the portion 7 is curved outwardly, as shown at 10 to present a convex face toward the main portion of the rod 5. There is thus formed a rearwardly and outwardly curved hook at one end of the rod. The opposite end of the rod from the hook is bent upon itself to form a longitudinally extending elongated loop 12, which is thus formed integral with the rod.

The present catcher may be used either to catch animals or fowls by engaging the hook with their legs, and may be used to catch animals by engaging the loop over their heads. When used in the former manner, the fore arm of the user is passed through the loop 12, and his hand grasps the rod adjacent to the loop, the forward portion of the latter forming a suitable grip and the engagement of the arm through the loop acting as a support for the weight of the rod. When used in the last mentioned manner, the rod may be grasped by the hooked portion and the loop 12 brought over the animal's head after which the rod may be turned to bring the animal's head transversely of the loop so that it may not be disengaged therefrom. It will be understood that the kink 8 which forms the loop 9 is engaged by the leg of the animal when the hook is engaged therewith, and that the portion 7 is thus moved outwardly to allow the animal's leg to pass into the loop 9 within which it is held, without serious injury.

From the foregoing, it will be seen that the present invention provides an animal catcher of cheap and simple nature which may be manufactured and sold at a very low figure and which may be used to catch animals in different manners, the parts facilitating these two operations coacting with each other in either operation.

What is claimed is:

As an article of manufacture, a catching device comprising a metallic rod bent upon itself at one end to form a leg engaging hook, said rod having its opposite end portion bent to form an elongated longitudinally extending loop arranged for engagement at times with the neck of an animal and at times to receive therethrough the arm of the user of the device to facilitate the manipulation thereof.

In testimony whereof I affix my signature, in presence of two witnesses.

WILLIAM G. TARRANT.

Witnesses:
 A. O. McCOY,
 CHAS. HALK.